US012257728B2

(12) United States Patent
Wang et al.

(10) Patent No.: US 12,257,728 B2
(45) Date of Patent: Mar. 25, 2025

(54) SHAFT-LOCKING FOLDING KNIFE

(71) Applicant: CUTTWAY PRODUCTS CO., LTD., Taichung (TW)

(72) Inventors: Henry Wang, Taichung (TW); Race Wu, Taichung (TW)

(73) Assignee: CUTTWAY PRODUCTS CO., LTD., Taichung (TW)

( * ) Notice: Subject to any disclaimer, the term of this patent is extended or adjusted under 35 U.S.C. 154(b) by 324 days.

(21) Appl. No.: 18/097,983

(22) Filed: Jan. 17, 2023

(65) Prior Publication Data

US 2024/0217126 A1 Jul. 4, 2024

(30) Foreign Application Priority Data

Dec. 28, 2022 (TW) ................................ 111214436

(51) Int. Cl.
*B26B 1/04* (2006.01)

(52) U.S. Cl.
CPC .................................... *B26B 1/048* (2013.01)

(58) Field of Classification Search
CPC .. B26B 1/048; B26B 1/04; B26B 1/02; B26B 1/10; B26B 1/044
See application file for complete search history.

(56) References Cited

U.S. PATENT DOCUMENTS

| | | | | |
|---|---|---|---|---|
| 5,815,927 | A * | 10/1998 | Collins | B26B 1/048 30/155 |
| 7,340,837 | B1 * | 3/2008 | Busse | B26B 1/048 30/160 |
| 7,395,599 | B2 * | 7/2008 | Onion | B26B 1/02 30/158 |
| 8,572,851 | B2 | 11/2013 | Duey | |
| 8,745,878 | B2 * | 6/2014 | Glesser | B26B 1/048 30/155 |
| 9,862,104 | B2 | 1/2018 | France | |
| 2003/0145468 | A1 * | 8/2003 | Glesser | B26B 1/048 30/161 |

* cited by examiner

*Primary Examiner* — Jennifer S Matthews
(74) *Attorney, Agent, or Firm* — Birch, Stewart, Kolasch & Birch, LLP

(57) ABSTRACT

Provided is a shaft-locking folding knife including: a blade pivotally disposed between two side plates and having a first engaging portion and a second engaging portion, with the side plate each having a slotted hole and a pivotal hole; a telescopic rod unit with one end pivotally disposed between the two pivotal holes of the two side plates and the other end having a bolt disposed between the two slotted holes, the telescopic rod unit having a blocking portion engaged with the first engaging portion or the second engaging portion of the blade; and a control element disposed at an extensible rod of the telescopic rod unit and exposed from the two side plates.

6 Claims, 6 Drawing Sheets

SHAFT-LOCKING FOLDING KNIFE

BACKGROUND OF THE INVENTION

1. Technical Field

The present disclosure relates to folding knives and, more particularly, to a shaft-locking folding knife.

2. Description of Related Art

Folding knives are cutting tools which are easy to use and store, as disclosed in U.S. Pat. Nos. 8,572,851 and 9,862,104. The folding knives each essentially comprise a handle and a blade pivotally connected to one end of the handle and rotatable relative to the handle. The handle has a slotted hole that opens on the two opposing sides of the handle. A pin is penetratingly disposed at the slotted hole. The two ends of the pin are exposed from the slotted hole opening on the two opposing sides of the handle, respectively, so as to be operated by a user. At least two notches are disposed at the blade and positioned proximate to the point of the pivotal connection of the blade and the handle, thereby allowing the pin to be engaged with the at least two notches. With the pin being engaged with the notches of the blade and the slotted hole of the handle, the blade can be locked in place. To rotate the blade relative to the handle, the user has to move the pin from one end of the slotted hole to the other end of the slotted hole to allow the pin to escape from the notches of the blade.

However, the folding knives consist of plenty parts and components and are complicated and thereby take too many processes and too much time to manufacture. Furthermore, the assembly of the folding knives needs assistance, especially assistance in fixing a spring or the pin, to the detriment of rapid manufacturing.

BRIEF SUMMARY OF THE INVENTION

It is an objective of the disclosure to provide a shaft-locking folding knife that is simple in structure, convenient to assemble, suitable for rapid manufacturing and easy to operate.

In order to achieve the above and other objectives, the disclosure provides a shaft-locking folding knife comprising a blade, a telescopic rod unit, and a control element. The blade is pivotally disposed between two side plates and adapted to switch between an open position and a close position. The blade has a first engaging portion and a second engaging portion. The two side plates each have a slotted hole and a pivotal hole. The telescopic rod unit comprises a stationary rod and an extensible rod capable of extending and moving. One end of the stationary rod is pivotally disposed between two pivotal holes of the two side plates. A bolt is disposed at one end of the extensible rod and disposed between the two slotted holes of the two side plates. A blocking portion is disposed at the extensible rod and engaged with the first engaging portion or the second engaging portion of the blade. The control element is disposed at the extensible rod and exposed from the two side plates.

The shaft-locking folding knife of the disclosure is conducive to simplifying a conventional spring and control structure, which are otherwise too complicated for an assembly process to be carried out, to become a module, so as to simplify a manufacturing process and an assembly process, reduce manufacturing time, and enhance manufacturing efficiency.

Preferably, a notch is disposed on an upper edge of each side plate, with the control element disposed at the extensible rod and exposed from the notches of the two side plates.

Preferably, the shaft-locking folding knife further comprises at least one spacer disposed between the two side plates.

DETAILED DESCRIPTION OF THE INVENTION

Figure 1:
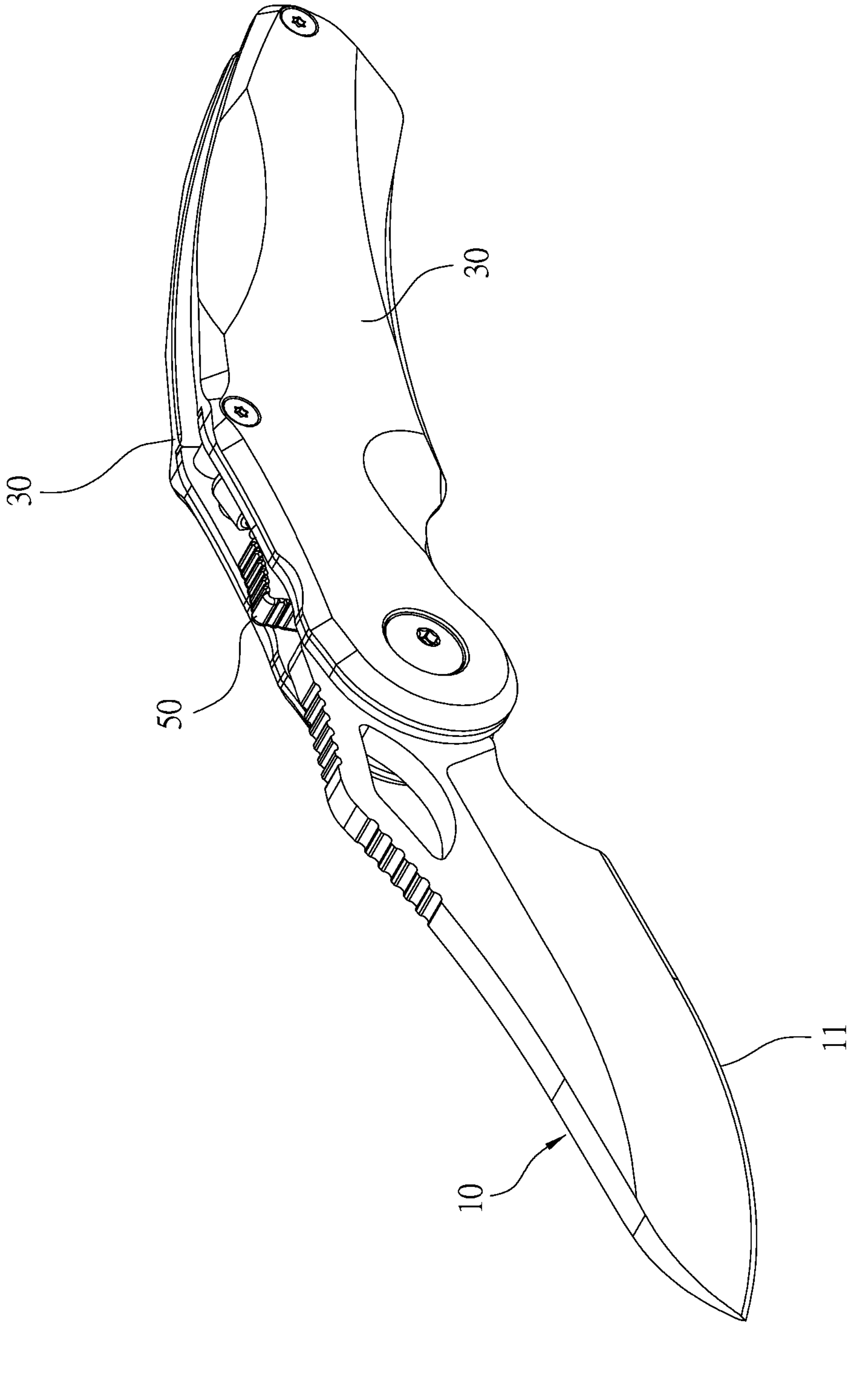
FIG. 1 is a schematic perspective view of a shaft-locking folding knife of the disclosure.
Figure 2:
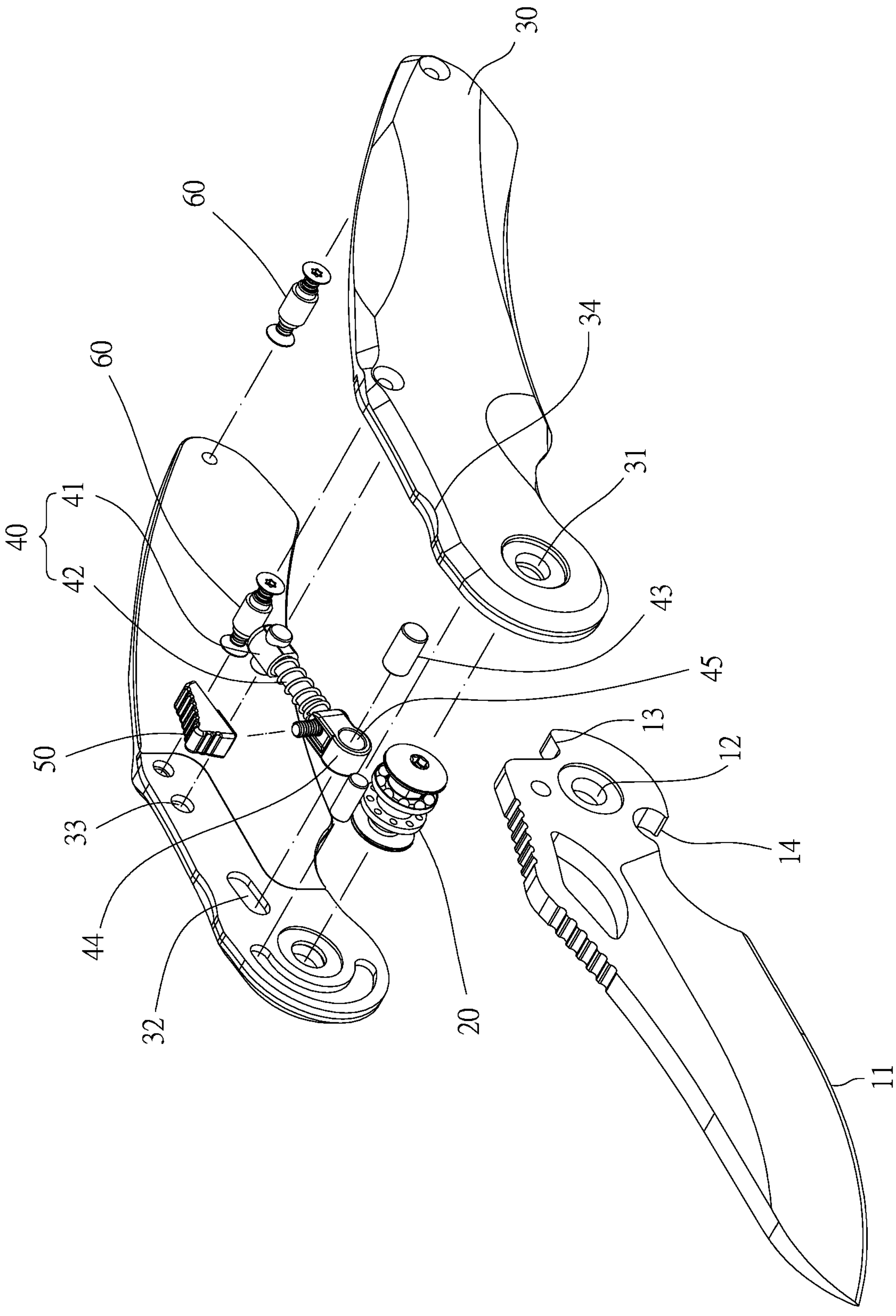
FIG. 2 is an exploded view of the shaft-locking folding knife of the disclosure.

Direction-related expressions used herein, including the embodiments below and the appended claims, must be interpreted with reference to directions indicated in the accompanying diagrams of the disclosure. Identical reference numerals used in the embodiments below and the accompanying diagrams denote identical or similar components or technical features thereof.

Referring to FIG. 1 through FIG. 6, a shaft-locking folding knife of the disclosure comprises a blade 10, an axle 20, two side plates 30, a telescopic rod unit 40, a control element 50 and two spacers 60.

Figure 5:
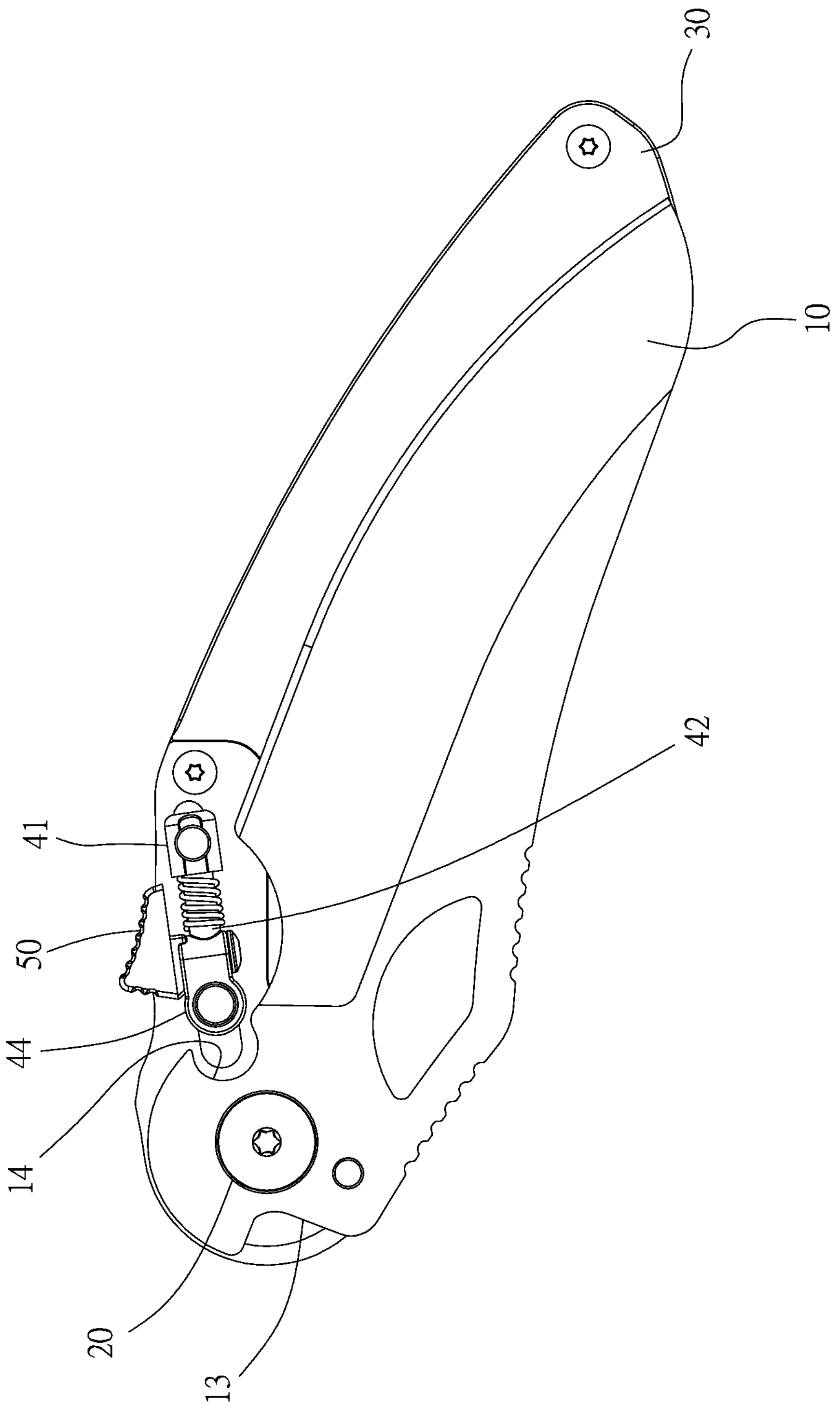
FIG. 5 is a schematic view based on FIG. 3 and illustrative of the shaft-locking folding knife with a blade folded according to the disclosure.

The blade 10 has a cutting-edge portion 11. A pivotal hole 12 is disposed at one end of the blade 10. A first engaging portion 13 and a second engaging portion 14 are disposed at the blade 10 and positioned at the periphery of the pivotal hole 12. Centered at the pivotal hole 12, an included angle θ at least greater than or equal to 90 degrees is defined between the first engaging portion 13 and the second engaging portion 14, as shown in FIG. 5.

The axle 20 is disposed at the pivotal hole 12 of the blade 10.

The two side plates 30 are intended to be gripped by a user. The two side plates 30 flank the blade 10 so as for the blade 10 to be sandwiched between the two side plates 30. The two side plates 30 are mirror-symmetric to each other; thus, the disclosure is hereunder exemplified by one side plate instead of two side plates as needed. A pivotal portion 31 is disposed at one end of each side plate 30. With the pivotal portion 31 being disposed at one end of the axle 20, the blade 10 can rotate relative to the side plate 30 to thereby switch between an open position and a close position. A slotted hole 32 is disposed on each of two opposing inner sides of the two side plates 30 and positioned proximate to the pivotal portions 31. A pivotal hole 33 is disposed on the side plate 30. The pivotal holes 33 disposed on the side plates 30 are aligned in the direction of extension of the long axis of the slotted holes 32 disposed on the side plates 30. A notch 34 is disposed on the upper edge of each side plate 30.

The telescopic rod unit 40 is a pneumatic, hydraulic or spring-driven telescopic rod unit. This embodiment is exemplified by a spring-driven telescopic rod unit, but the disclosure is not limited thereto. The telescopic rod unit 40 comprises a stationary rod 41 and an extensible rod 42 capable of extending and moving. The extensible rod 42 is fitted inside the stationary rod 41 to thereby extend and move relative to the stationary rod 41. One end of the stationary rod 41 is pivotally disposed between the two pivotal holes 33 of the two side plates 30. A bolt 43 is disposed at one end of the extensible rod 42 and positioned between the two slotted holes 32 of the two side plates 30. The bolt 43 undergoes reciprocating motion along the long axis of the slotted holes 32 because of the extension and movement of the extensible rod 42. The extensible rod 42 has a blocking portion 44. In this embodiment, a hole 45 is centrally disposed at the blocking portion 44, and the bolt 43 is penetratingly disposed at the hole 45.

The control element 50 is disposed at the extensible rod 42 and exposed from the notches 34 of the two side plates 30.

The two spacers 60 are disposed between the two side plates 30. The spacers 60 maintain the distance between the two side plates 30; thus, the embodiments of the disclosure are not restrictive of the shape of the spacers 60.

The manufacturing and assembly of the shaft-locking folding knife of the disclosure entails treating the telescopic rod unit 40 as a modularized component, then pivotally connecting one end of the stationary rod 41 to the pivotal hole 33 of one side plate 30, and fitting the bolt 43 to the slotted holes 32 of the two side plates 30. Therefore, the manufacturing and assembly of the shaft-locking folding knife of the disclosure is rapid, simple, easy, and conducive to reduction of assembly processes and assembly time, and does not require jig-based assistance. After the telescopic rod unit has been positioned in place, it is covered with the other side plate 30. Finally, the control element 50 is fastened to the extensible rod 42 to finish the assembly process rapidly and easily.

Figure 3:
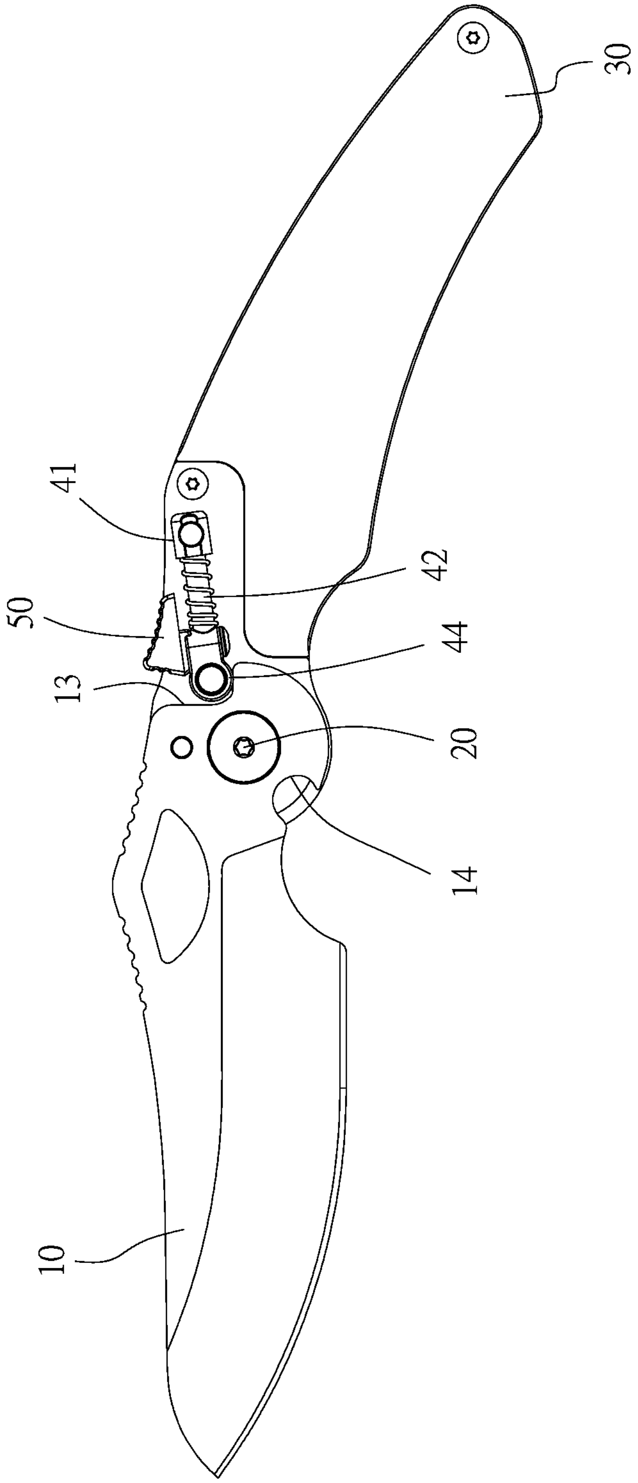
FIG. 3 is a side view of the shaft-locking folding knife with a side plate removed according to the disclosure.

Regarding the telescopic rod unit 40, the extensible rod 42 is initially positioned distal to the stationary rod 41 while the user is operating the shaft-locking folding knife of the disclosure. Therefore, the blocking portion 44 is normally positioned distal to the stationary rod 41. At this point in time, as shown in FIG. 3, the blade 10 is protruded outward, and the blocking portion 44 is engaged with the first engaging portion 13 of the blade 10.

Figure 4:
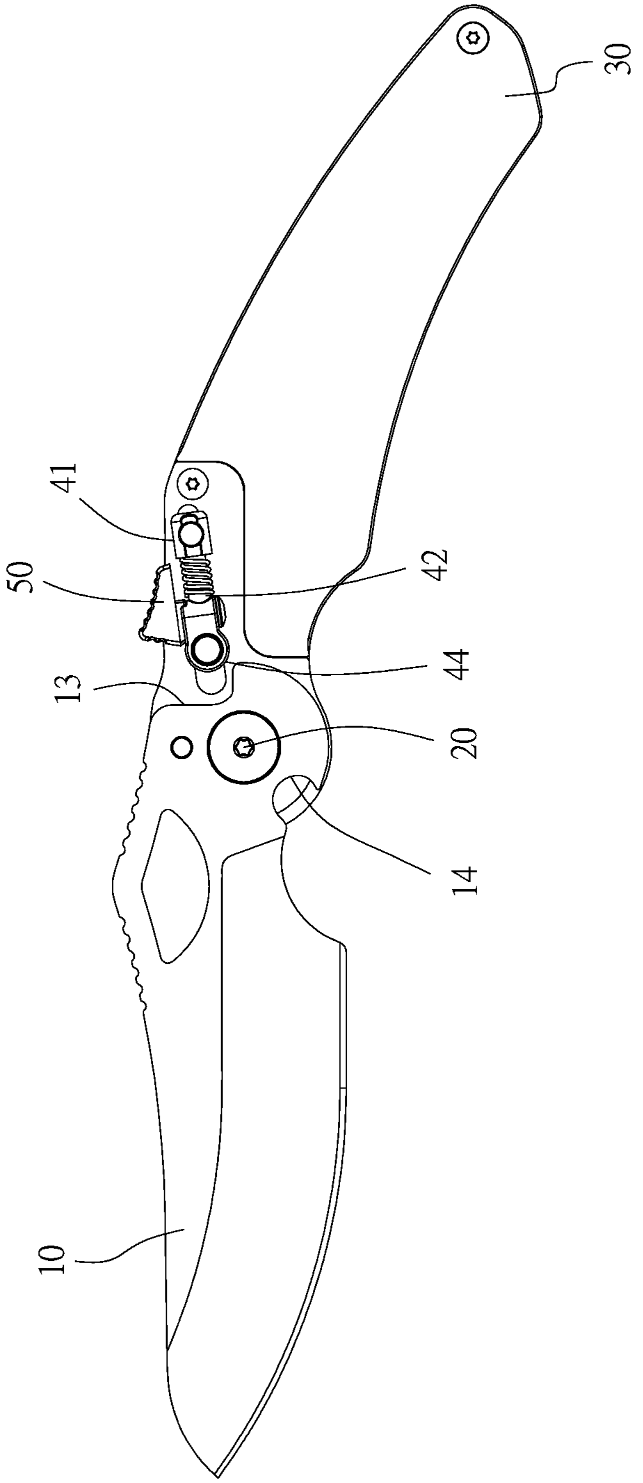
FIG. 4 is a schematic view based on FIG. 3 and illustrative of movement of a control element of the shaft-locking folding knife of the disclosure.

To rotate and hide the blade 10, the user moves the control element 50 toward the stationary rod 41 to not only cause retraction of the extensible rod 42 but also cause disengagement of the blocking portion 44 from the first engaging portion 13, as shown in FIG. 4. At this point in time, the blade 10 is rotatable relative to the two side plates 30.

Figure 6:
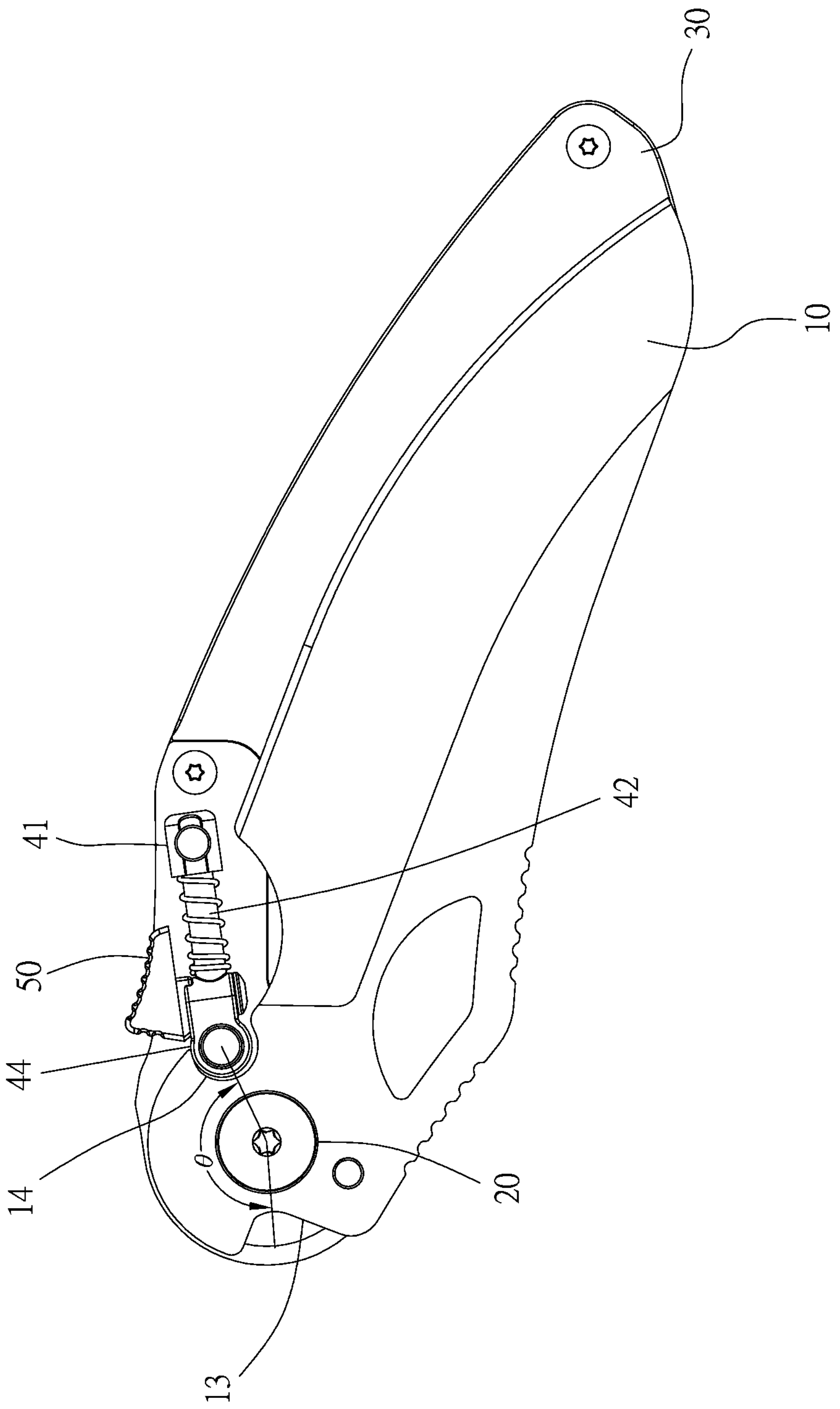
FIG. 6 is a schematic side view based on FIG. 3 and illustrative of the shaft-locking folding knife with the control element having returned to its initial position according to the disclosure.

As shown in FIG. 5, the rotation of the blade 10 to eventually attain the close position is followed by the release of the control element 50 to not only allow the extensible rod 42 to return to its initial position but also allow the blocking portion 44 to be moved forward and engaged with the second engaging portion 14 of the blade 10, as shown in FIG. 6, thereby allowing the blade 10 to be hidden and fixed in place.

According to the disclosure, the control element and the telescopic rod unit are fastened together to become a modularized component beforehand, thereby rendering the assembly process simple. The shaft-locking folding knife of the disclosure is conducive to simple, rapid manufacturing process and assembly process. Furthermore, the shaft-locking folding knife of the disclosure can be operated with the control element by a user, using only one hand.

What is claimed is:

1. A shaft-locking folding knife, comprising:

a blade having a cutting-edge portion, with a pivotal hole disposed at an end of the blade, wherein a first engaging portion and a second engaging portion are disposed at a periphery of the blade on opposite sides of the pivotal hole;

an axle disposed at the pivotal hole of the blade; two side plates, with a pivotal portion disposed at an end of each said side plate, with the pivotal portion being disposed at an end of the axle, thereby allowing the blade to rotate relative to two said side plates, wherein a slotted hole and a pivotal hole are disposed on each of two opposing inner sides of two said side plates;

a telescopic rod unit having a stationary rod and an extensible rod capable of extending and moving, the extensible rod having a blocking portion and being fitted inside the stationary rod to thereby extend and move relative to the stationary rod, wherein an end of the stationary rod is pivotally disposed between two said pivotal holes of two said side plates, wherein a bolt is disposed at an end of the extensible rod and positioned between two said slotted holes of two said side plates; and a control element disposed at the extensible rod and exposed from two said side plates.

2. The shaft-locking folding knife of claim 1, wherein a notch is disposed on an upper edge of each said side plate, with the control element disposed at the extensible rod and exposed from the notches of two said side plates.

3. The shaft-locking folding knife of claim 2, wherein, an included angle at least greater than or equal to 90 degrees is defined between the first engaging portion and the second engaging portion at the center of the pivotal hole.

4. The shaft-locking folding knife of claim 1, wherein a hole is centrally disposed at the blocking portion, and the bolt is penetratingly disposed in the hole.

5. The shaft-locking folding knife of claim 2, wherein the pivotal holes of two said side plates are aligned in a direction of extension of a long axis of two said slotted holes of two said side plates.

6. The shaft-locking folding knife of claim 5, wherein a hole is centrally disposed at the blocking portion, and the bolt is penetratingly disposed in the hole.

* * * * *